US011822664B2

United States Patent
Kovah et al.

(10) Patent No.: US 11,822,664 B2
(45) Date of Patent: Nov. 21, 2023

(54) SECURELY SIGNING CONFIGURATION SETTINGS

(71) Applicant: Apple Inc., Cupertino, CA (US)

(72) Inventors: Xeno S. Kovah, Milpitas, CA (US); Nikolaj Schlej, Deggendorf (DE); Thomas P. Mensch, Sunnyvale, CA (US); Wade Benson, San Jose, CA (US); Jerrold V. Hauck, Windermere, FL (US); Josh P. de Cesare, Los Gatos, CA (US); Austin G. Jennings, San Jose, CA (US); John J. Dong, San Jose, CA (US); Robert C. Graham, San Jose, CA (US); Jacques Fortier, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 448 days.

(21) Appl. No.: 17/092,030

(22) Filed: Nov. 6, 2020

(65) Prior Publication Data

US 2021/0397716 A1 Dec. 23, 2021

Related U.S. Application Data

(60) Provisional application No. 63/042,050, filed on Jun. 22, 2020.

(51) Int. Cl.
*G06F 21/57* (2013.01)
*G06F 21/72* (2013.01)
(Continued)

(52) U.S. Cl.
CPC .......... *G06F 21/575* (2013.01); *G06F 9/4406* (2013.01); *G06F 21/72* (2013.01);
(Continued)

(58) Field of Classification Search
CPC ...... G06F 21/575; G06F 9/4406; G06F 21/72; G06F 21/73; G06F 2221/034;
(Continued)

(56) References Cited

U.S. PATENT DOCUMENTS 9,547,778 B1 1/2017 Paaske et al.
10,079,677 B2 9/2018 Benson et al.
(Continued)

OTHER PUBLICATIONS

IOS Security—iOS11, Jan. 2018, Apple Inc., 82 pages.
International Search Report and Written Opinion in PCT Appl. No. PCT/US2021/038039 dated Sep. 23, 2021, 17 pages.

*Primary Examiner* — Michael J Brown
(74) *Attorney, Agent, or Firm* — Kowert, Hood, Munyon, Rankin & Goetzel, P.C.; Paul T. Seegers; Michael B. Davis

(57) ABSTRACT

Techniques are disclosed relating to securing computing devices during boot. In various embodiments, a secure circuit of a computing device generates for a public key pair and signs, using a private key of the public key pair, configuration settings for an operating system of the computing device. A bootloader of the computing device receives a certificate for the public key pair from a certificate authority and initiates a boot sequence to load the operating system. The boot sequence includes the bootloader verifying the signed configuration settings using a public key included in the certificate and the public key pair. In some embodiments, the secure circuit cryptographically protects the private key based on a passcode of a user, the passcode being usable by the user to authenticate to the computing device.

20 Claims, 7 Drawing Sheets

(51) Int. Cl.
*H04L 9/32* (2006.01)
*H04L 9/08* (2006.01)
*H04L 9/40* (2022.01)
*G06F 21/73* (2013.01)
*G06F 9/4401* (2018.01)

(52) U.S. Cl.
CPC ............ *G06F 21/73* (2013.01); *H04L 9/0897* (2013.01); *H04L 9/3226* (2013.01); *H04L 9/3236* (2013.01); *H04L 9/3268* (2013.01); *H04L 63/123* (2013.01); *G06F 2221/034* (2013.01)

(58) Field of Classification Search
CPC ... H04L 9/0897; H04L 9/3226; H04L 9/3236; H04L 9/3268; H04L 63/123; H04L 63/126; H04L 9/3247; H04L 9/3263; H04L 63/0823
USPC .................................................. 713/1, 2, 100
See application file for complete search history.

(56) References Cited

U.S. PATENT DOCUMENTS

| | | |
|---|---|---|
| 10,417,429 B2 | 9/2019 | de Cesare et al. |
| 10,536,271 B1 | 1/2020 | Mench et al. |
| 2004/0193873 A1 | 9/2004 | England |
| 2017/0373843 A1* | 12/2017 | Benson ................. H04L 9/3234 |
| 2018/0349608 A1 | 12/2018 | de Cesare et al. |
| 2018/0365427 A1* | 12/2018 | Callaghan ............. G06F 21/575 |

\* cited by examiner

SECURELY SIGNING CONFIGURATION SETTINGS

The present application claims priority to U.S. Prov. Appl. No. 63/042,050, filed Jun. 22, 2020, which is incorporated by reference herein in its entirety.

BACKGROUND

Technical Field

This disclosure relates generally to computing devices, and, more specifically, to securing computing devices during boot.

Description of the Related Art

When a computer is powered on, it may perform a boot strapping procedure to eventually load an operating system. As part of performing this procedure, the computer may initialize various resources and load drivers used by the operating system. The computer may also perform various checks in order to determine that the computer is operating as intended. These checks may include, for example, testing memory, user interface devices, processor functionality, etc. As the computer may also be particularly vulnerable to security breaches, the computer may perform various checks to confirm, for example, that the bootloader and operating system have not been tampered with before allowing further execution.

Figure 1:
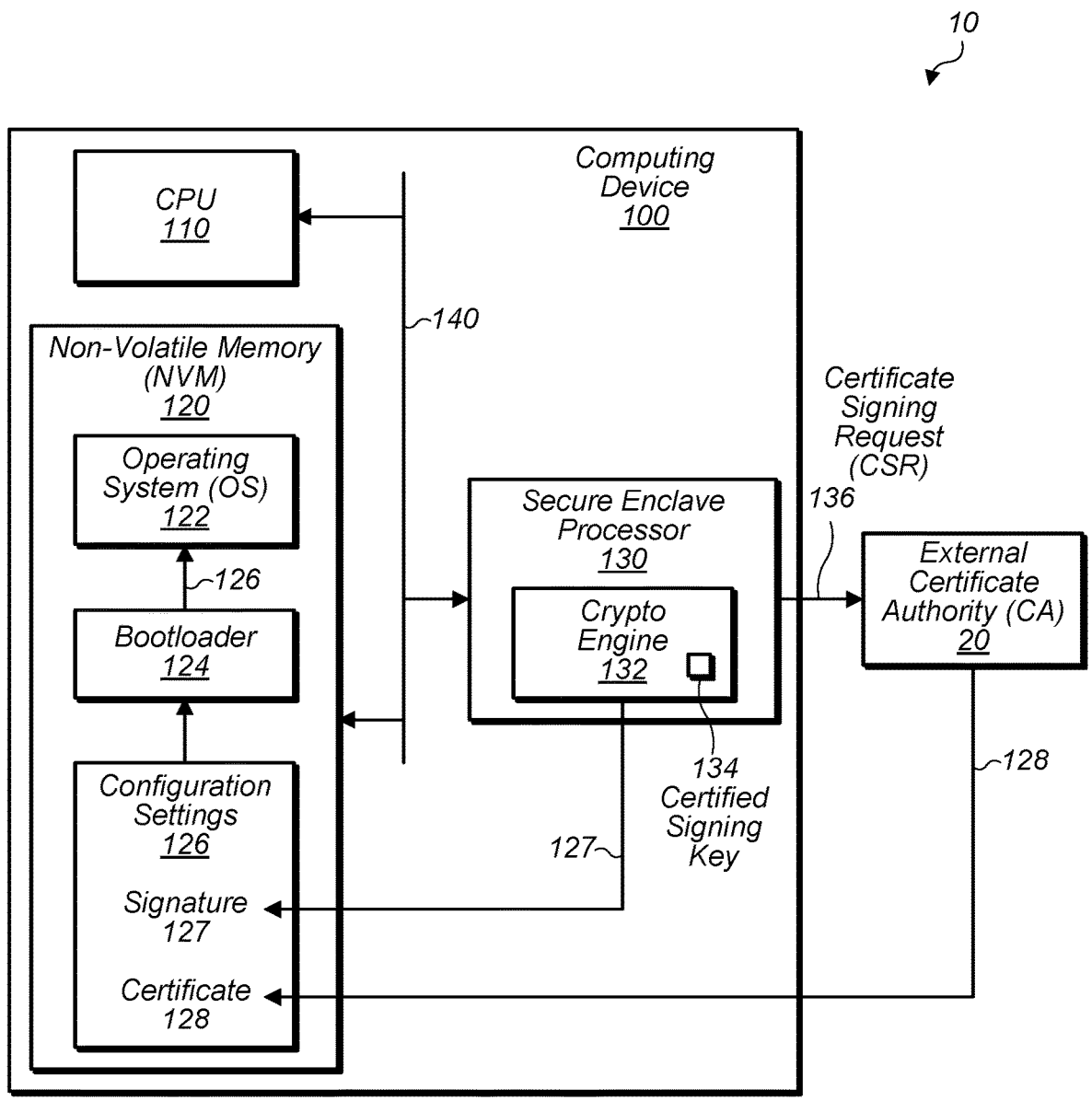
FIG. 1 is a block diagram illustrating an example of a computing device configured to securely verify configuration settings during a boot sequence.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure circuit configured to sign configuration settings for an operating system" is intended to cover, for example, an integrated circuit that has circuitry (e.g., dedicated cryptographic hardware) that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a secure circuit may derive first and second cryptographic keys. The term "first" is not limited to the initial cryptographic key derived by the secure circuit. The term "first" may also be used when only one key exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

An operating system may provide various configuration settings that can be altered to modify behaviors of a computing device. These settings, for example, may pertain to device security, network interface behavior, user account access, accessibility functionality, etc. To facilitate alteration of these settings, the operating system may provide a user interface (e.g., a control panel) or accessible configuration files through which these settings can be altered. While alteration of these settings can beneficially allow a user to personalize operation of their device, these settings also present a potential vulnerability as an unauthorized actor may attempt to modify these settings in a malicious manner. For example, an unauthorized actor may attempt to disable various security functionality of a device in order to further compromise the device.

The present disclosure describes embodiments in which configuration settings of a computing device are securely signed by secure hardware within the computing device in order to prevent, for example, an unauthorized modification of the settings. As will be described below in various embodiments, a secure circuit within the computing device generates and maintains a private key used by the secure circuit to sign the configuration settings. When a boot sequence of the computing device is initiated, a bootloader verifies the signed configuration settings using a public key corresponding to the private key. To establish that the secure circuit is performing the signing, the secure circuit may request that a certificate authority trusted by the bootloader certify the public-key pair in order to provide a further indicium of trust to the signed configuration settings. In some embodiments, the private key used to sign the configuration settings is cryptographically protected by the secure circuit based on an authorized user's passcode. Thus, if a user wants to alter the settings, the user can provide the passcode in order to enable the secure circuit to obtain access to the private key and sign the altered settings. If, on the other hand, the user is unable to present the passcode, the user may be barred from altering the settings. In some embodiments, to add further security, the certification of the private, signing key may be contingent on the computing device contacting an external server (e.g., associated with a manufacturer of the device) in order to confirm that an activation lock has not been placed on the device by an owner, for example, reporting that the device has been lost or stolen.

Turning now to FIG. 1, a block diagram of a system 10 for verifying configuration settings of an operating system is depicted. In the illustrated embodiment, system 10 includes a computing device 100 and a certificate authority (CA) 20 external to computing device 100. Computing device 100 may include a central processing unit (CPU) 110, non-volatile memory (NVM) 120, and secure enclave processor (SEP) 130, which may be connected via an interconnect 140. NVM 120 may include operating system (OS) 122, a bootloader 124, and configuration settings 126. SEP 130 may include a cryptographic engine 132. In some embodiments, computing device 100 may be implemented differently than shown. Accordingly, device 100 may include additional components such as those discussed below with respect to FIG. 6. In some embodiments, elements 122-126 may be in different memories.

OS 122, in various embodiments, is an operating system executable to manage various operations of computing device 100. Accordingly, OS 122 may include various drivers to facilitate interfacing with various hardware resources of computing device 100. OS 122 may also include a kernel to facilitate scheduling and managing of device resources. OS 122 may also include various firmware to be executed by hardware in device 100 to provide various services. As noted above, OS 122 may read various configuration settings 126 that control operation of OS 122 (or more generally computing device 100). These configuration settings 126 may correspond to any suitable settings such as those noted above. For example, in some embodiments, the configuration settings include one or more security settings that enable or disable one or more protection systems implemented by OS 122 to protect operation of computing device 100. For example, in one embodiment, OS 122 may implement a file protection system used to restrict access to critical system files, such as those residing OS 122's kernel space, and settings 126 may include a setting to enable or disable this protection. Although a single OS 122 is depicted in FIG. 1, in some embodiments, OS 122 may be one of multiple operating systems, each having a respected set of settings 126, which may be protected using the techniques described herein.

Bootloader 124, in various embodiments, is executable by CPU 110 to boot/load an operating system, such as OS 122, of computing device 100. Accordingly, bootloader 124 may perform a boot sequence that includes handling initializing hardware on device 100, performing one or more verification checks, initiating the execution of the OS kernel, etc. In some embodiments, bootloader 124 complies with the unified extensible firmware interface (UEFI) specification. As noted above, in various embodiments, bootloader 124 further verifies configuration settings 126 during the boot process in order to, for example, ensure that settings 126 have not been altered in an unauthorized manner. As will be described below, bootloader 124 may verify configuration settings using a signature 127 produced by SEP 130—along with the public key included certificate 128.

SEP 130, in various embodiments, is a secure circuit configured to perform cryptographic services for computing device 100. As used herein, the term "secure circuit" refers to one of a class of circuits that is configured to perform one or more services and return an authenticated response to an external requester. A result returned by a secure circuit is considered to have indicia of trust exceeding that of a circuit that merely returns a result without any form of authentication. In some embodiments, responses from SEP 130 are authenticated through the use of cryptography such as providing a digital signature or encrypted data. In some embodiments, responses from SEP 130 are authenticated by being communicated through a trusted communication channel such as a dedicated bus between SEP 130 and the other party or a mailbox mechanism discussed below. For example, in various embodiments, SEP 130 and an NVM controller of NVM 120 communicate via secure channel established using shared cryptographic keys. In contrast, a circuit such as a hardware accelerator that merely operates on some received value and returns a result would not be considered a secure circuit within the meaning of this application. By authenticating results that are returned, such as by signing with a verifiable digital signature, a secure circuit may thus provide anti-spoofing functionality. Additionally, in some cases, a secure circuit may be said to be "tamper-resistant," which is a term of art referring to mechanisms that prevent compromise of the portions of the secure circuit that perform the one or more services.

In various embodiments, SEP 130 is configured (via crypto engine 132) to generate a public key pair having a private key (shown as signing key 134) for signing configuration settings 126 to produce signature 127. In some embodiments, signing key 134 is cryptographically protected based on an authorized user's passcode to restrict SEP 130's access to key 134 in order to prevent an unauthorized actor from modifying settings 126 without the user's consent. In some embodiments, signing key 134 is also protected by a unique identifier that is stored in SEP 130 and that uniquely identifies the computing device from other computing devices. This unique-identifier protection may be performed, for example, to prevent configuration settings 126 from being provided to another computing device for its use (or conversely computing device 100 for using configuration settings obtained from another device). In order to provide a further indicium of trust for signing key 134, in the illustrated embodiments, SEP 130 requests that CA 20, which may be trusted by bootloader 124, certify signing key 134. As used herein, the term "certified key" generally refers to a public key or a private key of a key pair for which a corresponding certificate has been issued such as certificate 128.

CA 20, in various embodiments, issues certificates that certify the ownership of public keys and are usable to verify that owners are in possession of the corresponding private keys. As shown, SEP 130 may request certification of signing key 134 by issuing a certificate signing request (CSR) 136 to CA 20 for the public key pair generated by SEP 130. As used herein, the term "certificate signing request" refers generally to a request for a trusted authority to verify a collection of information attesting to the validity of a public key pair. CSR 136 may include any suitable information. In some embodiments, CSR 136 includes an identifier of intended use of key 134 (e.g., signing settings 126), the public key, and a signature produced from the corresponding private key (i.e., key 134). As will be described below in conjunction with FIG. 2, in some embodiments, SEP 130 further signs components of CSR 136 using a trusted key derived from an identifier embedded during manufacture of SEP 130 (or, more generally, manufacture of computing device 100). In some embodiments, CSR 136 complies with a standard format such as defined by the public-key cryptography standards (PKCS) #10 specification. Based on a successful verification of CSR 136, CA 20 may issue a certificate 128. As used herein, the term "certificate" refers generally to a collection of information (e.g., a token) that can be presented to establish that a trusted authority has verified information attesting to the validity of a public-key pair. Certificate 128 may include any suitable information. In some embodiments, certificate 128 includes an identifier of CA 20, the public key presented in CSR 136, a period for when the certificate is valid, and a signature generated from the certificate 128 using a private key held by CA 20 and trusted by bootloader 124. In some embodiments, certificate 128 complies with a standard format such as defined by the X.509 standard.

Upon receipt of certificate 128, computing device 100 may store certificate 128 in NVM 120 with settings 126. SEP 130 may then use certified signing key 134 to sign settings 126. In some embodiments, this may include OS 122 generating a hash value from settings 126 and causing SEP 130 to sign the hash value with key 134 to provide signature 127, which is stored with settings 126 and certificate 128. When a subsequent boot of OS 122 is later performed, bootloader 124 may verify signed configuration settings 126 using signature 127 and the public key included in the certificate (public key 212 discussed next with FIG. 2). In some embodiments, this verification may include generating another hash value from settings 126 and comparing this hash value with the earlier hash value, which be obtained from signature 127 using the public key. If the hashes match, bootloader 124 may continue loading OS 122 and allow it to access settings 126. If, however, verification of settings 126 fails, bootloader 124 may suspend loading OS 122 and identify the problem via a user interface of device 100.

In various embodiments, if an authorized user wants to subsequently alter settings 126, the user may provide a corresponding request to OS 122 along with his or her passcode. OS 122 may then make the requested changes and provide the altered version of configuration settings 126 and the passcode to SEP 130. SEP 130, in turn, may use the passcode to obtain access to signing key 134 and then use signing key 134 to sign the altered version of configuration settings 126. In some embodiments, prior to signing the altered version of configuration settings 126, OS 122 (or SEP 130 in other embodiments) may generate a nonce for inclusion in the altered version of configuration settings 126 signed by SEP 130. In such an embodiment, bootloader 124 may track the most recently signed nonce and compare it against the nonce included in the signed altered version of configuration settings 126 in order to prevent an earlier signed version of settings 126 from being reused.

Figure 2:
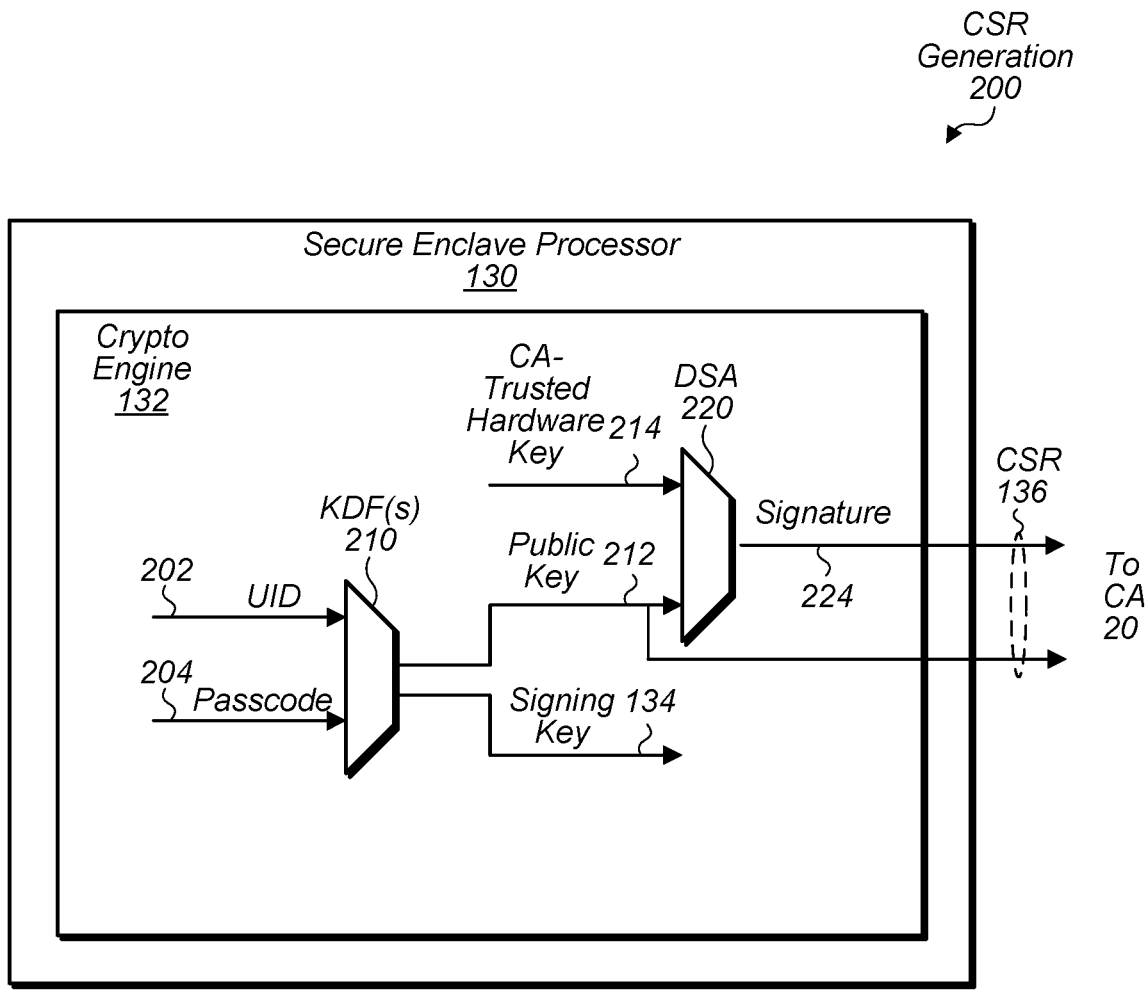
FIG. 2 is a block diagram illustrating an example of a generation of components for a certificate signing request for a key used to sign the configuration settings.

Turning now to FIG. 2, a block diagram of a CSR generation 200 is depicted. In the illustrated embodiment, engine 132 is configured to facilitate generation of CSR 136 by performing one or more key derivation functions (KDFs) 210 followed by an application of the digital signature algorithm (DSA) 220 to produce a signature 224 and public key 212 for inclusion in CSR 136. In some embodiments, CSR generation 200 may be implemented differently than shown such as will be discussed below.

KDF 210, in the illustrated embodiment, uses a unique identifier (UID) 202 and passcode 204 to create a public key pair including signing key 134 and its corresponding public key 212. KDF 210 may correspond to any suitable key derivation function such as an application of advanced encryption standard (AES) in cipher block chaining (AES-CBC) mode, keyed-hash message authentication code (HMAC), Secure Hash Algorithm (SHA), etc. In various embodiments, UID 202 is a value that uniquely identifies computing device 100 from other computing devices (or hardware within computing device 100 from similar hardware in other computing devices—thus, UID 202 may be a hardware seed to KDF 210). In some embodiments, UID 202 is stored in SEP 130 by burning a set of fuses to encode UID 202 during a fabrication of SEP 130 (or more generally device 100). In various embodiments, passcode 204 is the passcode usable by the user to authenticate to computing device 100. Accordingly, passcode 204 may include a sequence of user-supplied alpha-numeric characters, which may be received via an input device of computing device 100 such as a keyboard, touch screen, etc. Although two inputs are shown, in some embodiments, KDF 210 may take additional inputs such as an initialization vector (IV), other hardware identifiers, a salt, a key seed, etc.

As UID 202 and passcode 204 are inputs into KDF 210 in the illustrated embodiment, signing key 134 may be described as being cryptographically protected based on UID 202 and passcode 204 since UID 202 and passcode 204 are used to derive key 134. In other embodiments, signing key 134 is cryptographically protected based on UID 202 and passcode 204 by using a level of indirection. That is, UID 202 and passcode 204 may be inputs into a KDF that produces a master key used to encrypt signing key 134 and thus protect key 134—although signing key 134 and public key 212 may not be directly derived from UID 202 and passcode 204 in such an embodiment. As used herein, references to a key being "useable to decrypt/encrypt" something include either decrypting/encrypting with the key or using the key to derive (or decrypt) one or more additional keys that are used to decrypt/encrypt that thing. Also, although a single KDF 210 is depicted, in some embodiments, multiple nested KDFs 210 may be used.

DSA 220, in the illustrated embodiment, uses a CA-trusted hardware key 214 to sign public key 212 to produce a signature 224 usable by CA 20 to verify CSR 136. In various embodiments, hardware key 214 is trusted by CA 20 as it is derived, for example, by reading a hardware identifier embedded at manufacture to identify a presence of particular hardware in the computing device. For example, a manufacturer may burn fuses within SEP 130 to store a generation identifier into each of a particular class of devices known to have particular hardware, such as SEP 130, which can improve the security of a device. This hardware identifier may be used to derive key 214, which, in turn, is used to sign key 212 to produce signature 224. In other embodiments, however, other forms of trusted keys may be used to produce signature 224. In some embodiments, DSA 220 may also take additional non-depicted inputs being included in CSR 136 such as the nonce mentioned above. Although depicted as DSA, other signing algorithms may be employed.

Figure 3:
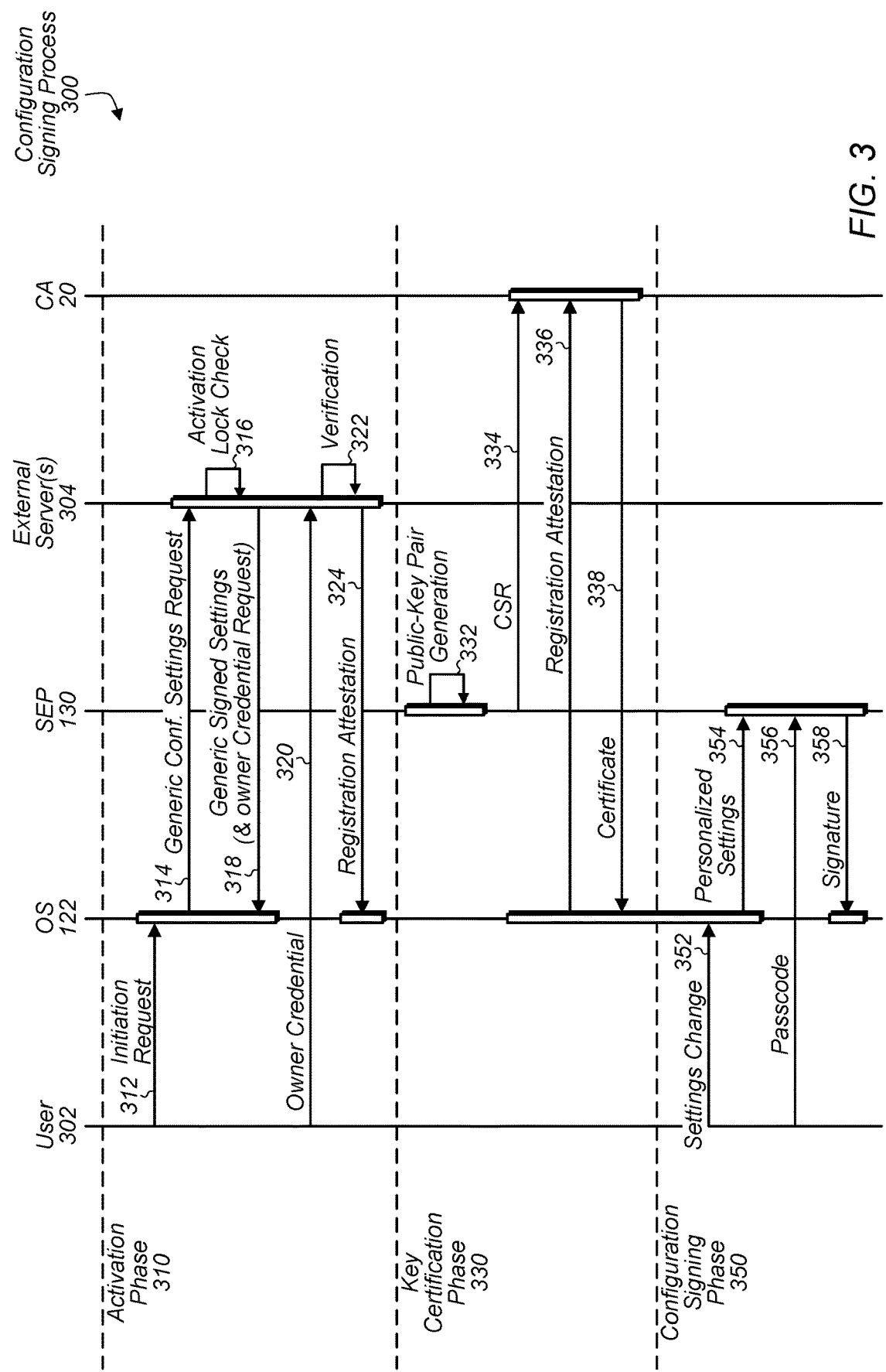
FIG. 3 is a communication diagram illustrating an example of a process for signing the configuration settings.

Turning now to FIG. 3, a communication diagram of configuration signing process 300 is depicted. In the illustrated embodiment, process 300 includes various exchanges among a user 302 of computing device 100, OS 122, SEP 130, one or more external servers 304, and CA 20. As shown, process 300 may include an activation phase 310 including steps 312-324, a key certification phase 330 including steps 332-338, and a configuration signing phase 350 including steps 352-358. In some embodiments, however, process 300 may be implemented differently than shown. Accordingly, more (or less) steps may be performed. In some performances of process 300 may include performances of only phases 330 and 350 (or only phase 350).

In the illustrated embodiment, process 300 may begin with activation phase 310 in order to initially set up computing device 100 and enable device 100 to perform a certification of signing key 134. As will be discussed, in some embodiments, this phase 310 may include downloading an initial set of trusted configuration settings that can be used by OS 122 until the signed configuration settings 126 can be obtained at the end of process 300. In some embodiments, this phase 310 may also be performed in order to determine whether an owner of device has requested placement of a lock to prevent activation of device 100—e.g., because the owner reported the device 100 to an external sever 304 as lost or stolen.

As shown, phase 310 may begin at step 312 with the user making an initiation request to start process 300. In some embodiments, this request may include powering on device 100 and causing bootloader 124 to boot OS 122 into a recovery mode. At step 314, OS 122 requests, from a server system 304, an initial set of configuration settings signed by the server system 304. In some embodiments, this initial set of configuration settings may be a generic set of configuration settings for device 100 and may be signed by the external server 304 in order to provide an indicium of trust to the settings. At step 316, the external server 304 may check whether that an owner has requested a disabling of the computing device 100 by placing an activation lock. At step 318, the external server 304 may provide the initial set of configuration settings for use by OS 122 until signed configuration settings 126 can be obtained from SEP 130. If an activation lock has been set for device 100, the external server 304 may also request a user credential registered to the owner in order to remove the activation lock. At step 320, user 302 may provide this owner credential via device 100 to the server 304. The external server 304 may, at step 322, perform a verification of the owner credential. In response to a success verification of the owner credential (or in response to no activation lock being placed), the server 304 provides, at step 324, an attestation indicating that computing device 100 is authorized to request certification of signing key 134.

Process 300 may then proceed to key certification phase 330 in which SEP 130 obtains certified signing key 134. As shown, phase 330 may begin with SEP 130 (using crypto engine 132) generating the public key pair including public key 212 and signing key 134. SEP 130 may then issue CSR 136 at 334 to CA 20 along with the registration attestation received at step 324, which may be provided by OS 122. In response to a successful verification of CSR 136 (using signature 224) and the registration attestation, CA 20 issues, at 338, certificate 128, which may be stored by OS 122 in NVM 120 with configuration settings 126.

Process 300 may then conclude with configuration signing phase 350 in which SEP 130 signs configuration settings 126. In the illustrated embodiment, phase 350 begins at 352 with a user requesting an alteration of setting 126. In some embodiments, however, this step may be omitted if, for example, a default set of settings 126 is being signed before a user has had any chance to request an alteration. At step 354, OS 122 may make the requested changes and provide the altered (and now user-personalized) settings 126 to SEP 130 for signing. In some embodiments, OS 122 may merely provide a hash value generated from settings 126; rather than, providing settings 126 in their entireties. In some embodiments, step 354 may include using signing key 134 to sign other information used by OS 122 such as binaries executed by computing device 100, boot chain objects, cache information, etc. At 356, OS 122 may also prompt the user for a passcode 204, which is provided to SEP 130 in order to obtain access to signing key 134. At step 358, SEP 130 may use signing key 134 to sign settings 126 and produce signature 127, which is returned to OS 122 for storage in NVM 120 with settings 126. In a subsequent boot, bootloader 124 can now use this signature 127 along with certificate 128 to verify the integrity of settings 126.

Figures 4A, 4B:
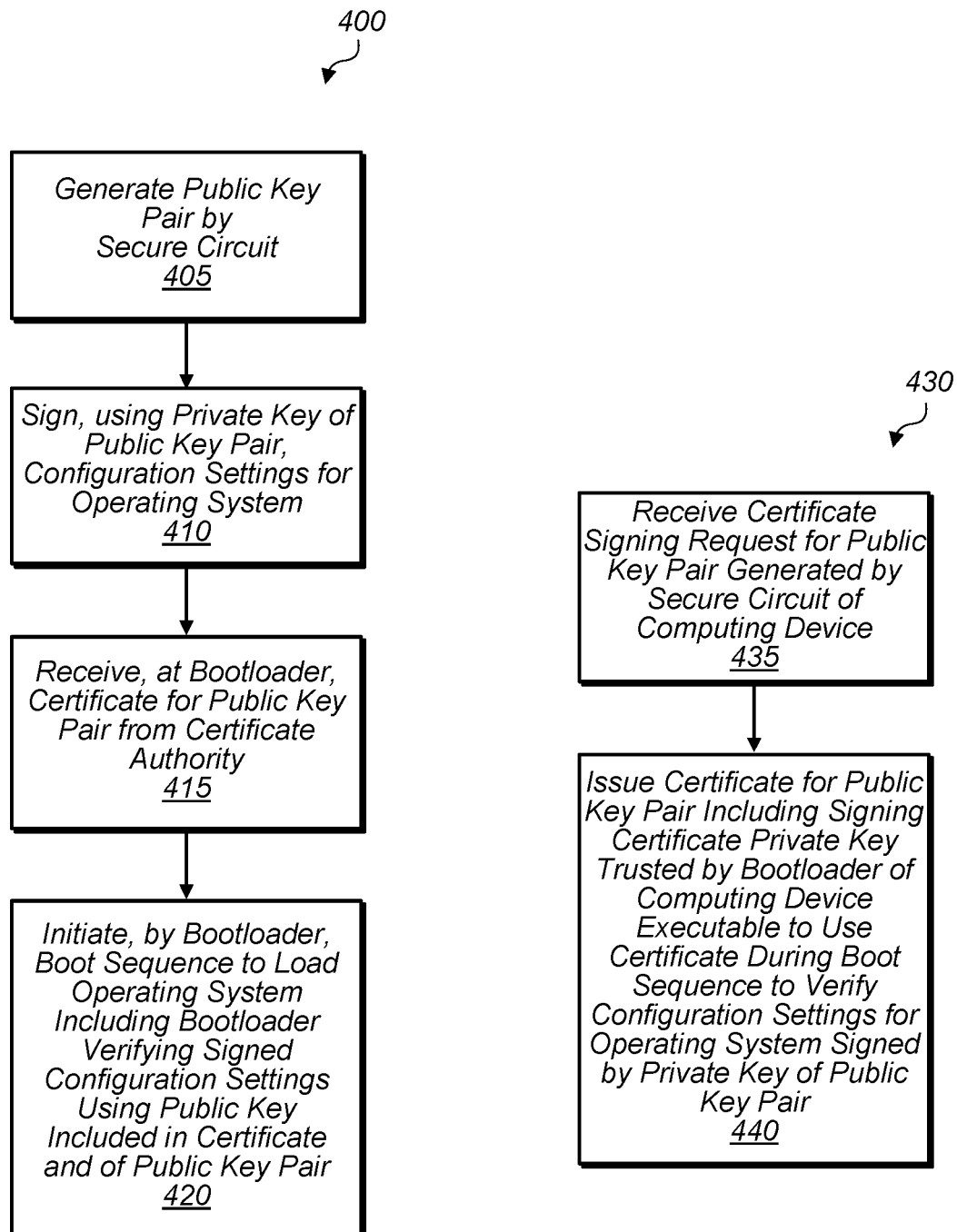
FIGS. 4A-C are flow diagrams illustrating examples of methods for securely verifying configuration settings.

Turning now to FIG. 4A, a flow diagram of a method 400 is depicted. Method 400 is one embodiment of a method for securely verifying configuration settings of a computing device such as computing device 100. In many instances, performance of method 400 may improve the overall security of the computing device.

Method 400 begins at step 405 with a secure circuit (e.g., SEP 130) of the computing device generating a public key pair (e.g., keys 134 and 212). In some embodiments, the computing device sends a user credential (e.g., owner credential at 320) to a server system operable to perform a verification of the user credential and a confirmation that an owner has not requested a disabling of the computing device. Based on the verification and the confirmation, the computing device receives, from the server system, an attestation (e.g., registration attestation at 324) indicating that the computing device is authorized to request certification of the private key and sends the attestation and a certificate signing request (e.g., CSR 136) for the public key pair to a certificate authority (e.g., CA 20) external to the computing device. In some embodiments, the secure circuit reads a hardware identifier (e.g., hardware key 214) embedded at manufacture to identify a presence of particular hardware in the computing device and uses the hardware identifier to sign (e.g., via signature 224) the certificate signing request.

At step 410, the secure circuit signs, using a private key (e.g., signing key 134) of the public key pair, configuration settings (e.g., configuration settings 126) for an operating system (e.g., OS 122) of the computing device. In various embodiments, the secure circuit cryptographically protects the private key based on a passcode (e.g., passcode 204) of a user, the passcode being usable by the user to authenticate to the computing device. In some embodiments, the secure circuit stores a unique identifier (UID) (e.g., UID 202) that uniquely identifies the computing device from other computing devices and cryptographically protects the private key based on the UID stored by the secure circuit. In some embodiments, the configuration settings include one or more security settings that enable or disable one or more protection systems implemented by the operating system to protect operation of the computing device. In some embodiments, the operating system is one of a plurality of operating systems having program instructions stored in the memory, and the secure circuit uses the private key to sign configuration settings for respective ones of the plurality of operating systems.

At step 415, the computing device receives, at a bootloader (e.g., bootloader 124), a certificate (e.g., certificate 128) for the public key pair from the certificate authority.

At step 420, the computing device initiates, by the bootloader, a boot sequence to load the operating system. In various embodiments, the boot sequence includes the bootloader verifying the signed configuration settings using a public key (e.g., public key 212) included in the certificate and of the public key pair.

In various embodiments, method 400 further includes the computing device receiving a request (e.g., settings change at 352) from the user to alter the configuration settings, the request including the passcode. In response to the request, the computing device provides an altered version of the configuration settings and the passcode to the secure circuit. The secure circuit uses the passcode to obtain access to the private key and uses the private key to sign the altered version of the configuration settings. In some embodiments, in response to the request to alter the configuration settings, the computing device generates a nonce for inclusion in the altered version of the configuration settings and causes the secure circuit to use the private key to sign the nonce with the signing of the altered version of the configuration settings. In some embodiments, prior to obtaining the signed configuration settings from the secure circuit, the computing devices boots the operating system into a recovery mode in which the operating system requests, from a server system, an initial set of configuration settings (e.g., generic signed settings at 318) signed by the server system and provides the initial set of configuration settings for use by the operating system until the signed configuration settings are obtained from the secure circuit Turning now to FIG. 4B, a flow diagram of a method 430 is depicted. Method 430 is one embodiment of a method for securely verifying configuration settings of a computing device and performed by a server system implementing a certificate authority such as external CA 20.

Method 430 begins at step 435 with the server system receiving a certificate signing request (e.g., CSR 136) for a public key pair generated by a secure circuit of a computing device. In some embodiments, the server system verifies a signature (e.g., signature 224) of the certificate signing request, the signature being generated using a hardware identifier (e.g., hardware key 214) embedded at manufacture to identify a presence of particular hardware in the computing device. In various embodiments, prior to issuing the certificate, the server system verifies a user credential (e.g., owner credential at 320) received from the computing device and confirms that an owner of the computing device has not requested a disabling of the computing device. In some embodiments, based on the verification and the confirmation, the server system provides an attestation (e.g., registration attestation at 324) indicating that the computing device is authorized to request certification of the public key pair and verifies that the attestation has been provided with the certificate signing request.

At step 440, the server issues a certificate (e.g., certificate 128) for the public key pair. In various embodiments, the issuing includes signing the certificate with a private key trusted by a bootloader (e.g., bootloader 124) of the computing device, the bootloader being executable to use the certificate during a boot sequence to verify configuration settings (e.g., configuration settings 126) for an operating system (e.g., OS 122) that are signed by a private key (e.g., certified signing key 134) of the public key pair generated by the secure circuit. In some embodiments, prior to the configuration settings being signed, the server system provides an initial set of configuration settings (e.g., generic signed settings at 318) for use by the operating system until the signed configuration settings are obtained from the secure circuit.

Figure 4C:
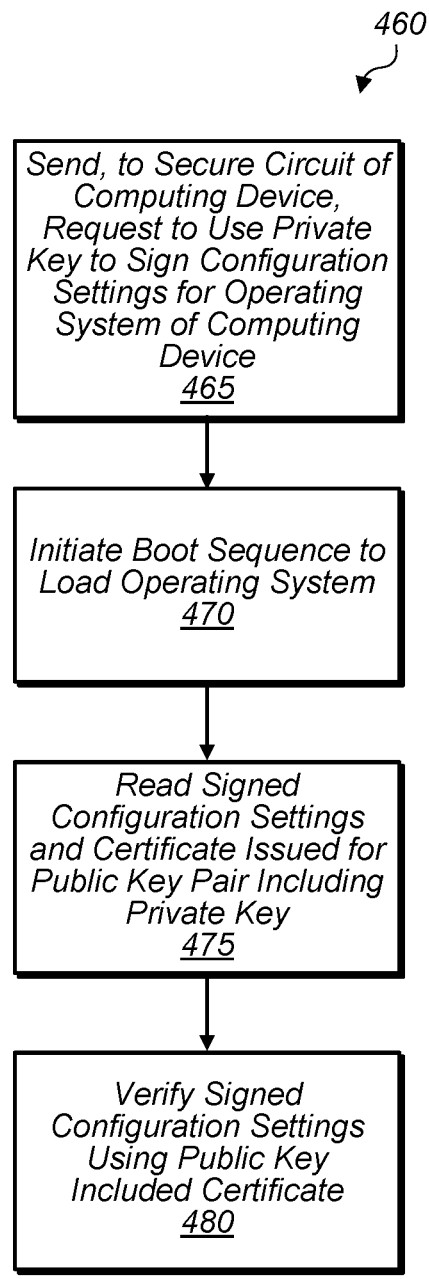

Turning now to FIG. 4C, a flow diagram of a method 460 is depicted. Method 460 is another embodiment of a method for securely verifying configuration settings of a computing device such as computing device 100.

Method 460 begins at step 465 with sending a request to a secure circuit (e.g., SEP 130) of the computing device to use a private key (e.g., certified signing key 134) to sign configuration settings (e.g., settings 126) for an operating system (e.g., OS 122) of the computing device. In some embodiments, a passcode (e.g., passcode 204) of the user is provided to the secure circuit to obtain access to the private key for signing the configuration settings. In some embodiments, a nonce is generated for inclusion in the configuration settings signed by the secure circuit. In some embodiments, the configuration settings control one or more security systems implemented by the computing device.

At step 470, a bootloader (e.g., bootloader 124) initiates a boot sequence to load the operating system. In some embodiments, the bootloader boots the operating system into a recovery mode in which the operating system requests, from a server system, an initial set of configuration settings signed by the server system, and the initial set of configuration settings are used until the signed configuration settings are obtained from the secure circuit.

At step 475, the bootloader reads the signed configuration settings and a certificate (e.g., certificate 128) issued for a public key pair including the private key.

At step 480, the bootloader verifies the signed configuration settings using a public key included in the certificate. In some embodiments, the bootloader verifies the inclusion of the nonce when verifying the signed configuration settings.

Figure 5:
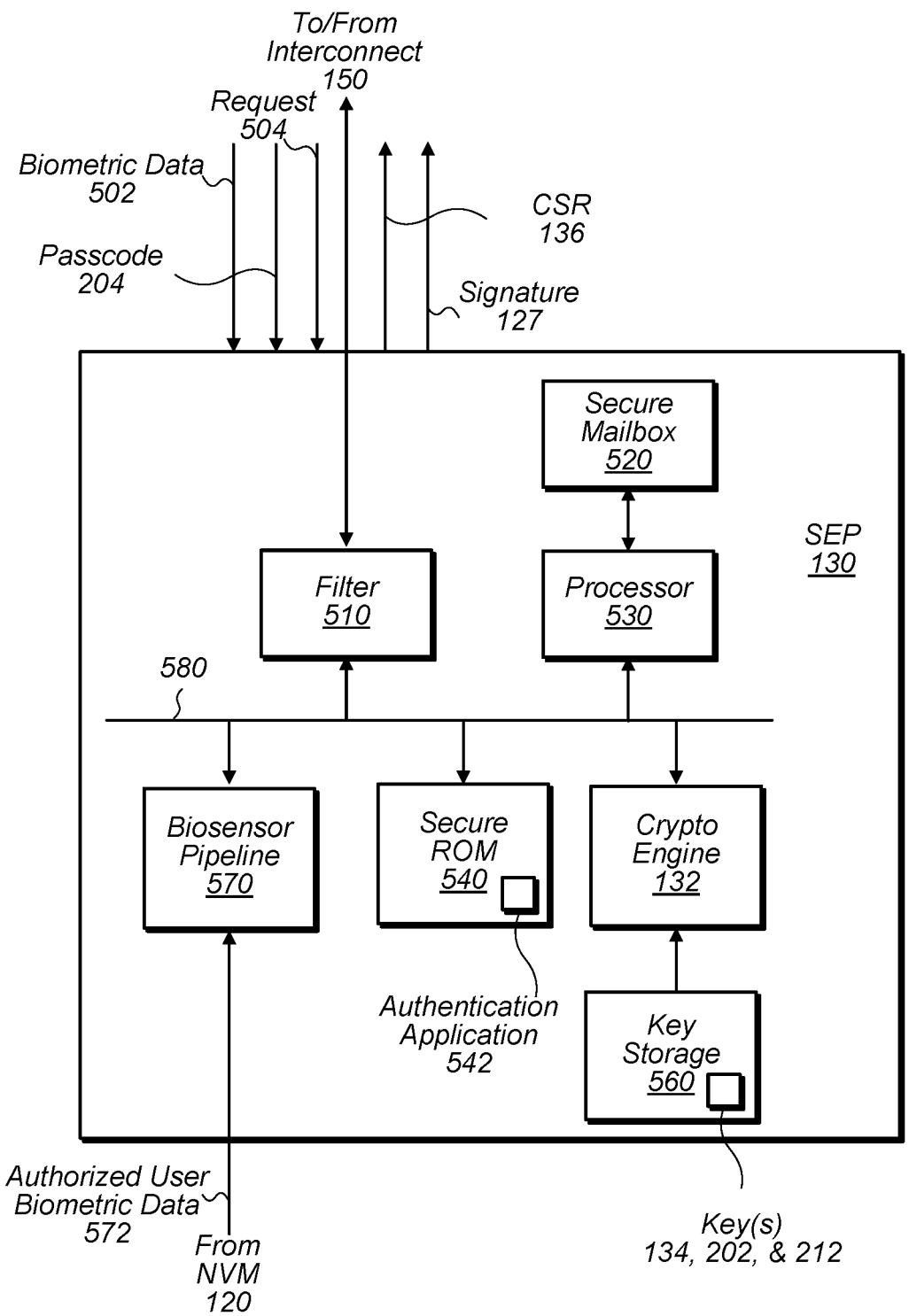
FIG. 5 is a block diagram illustrating an example of elements within a secure enclave processor included in the computing device.

Turning now to FIG. 5, a block diagram of SEP 130 is depicted. In the illustrated embodiment, SEP 130 includes a filter 510, secure mailbox mechanism 520, processor 530, secure ROM 540, cryptographic engine 132, a key storage 560, and a biosensor pipeline 570 coupled together via an interconnect 580. In some embodiments, SEP 130 may include more (or less) components than shown in FIG. 5. As noted above, SEP 130 is a secure circuit having tamper resistance. As discussed below, SEP 130 implements tamper resistance through the use of filter 510 and secure mailbox 520.

Filter 510 is circuitry configured to tightly control access to SEP 130 to increase the isolation of the SEP 130 from the rest of computing device 100, and thus the overall security of the device 100. More particularly, in one embodiment, filter 510 may permit read/write operations from a CPU 110 (or other peripherals coupled to interconnect 140) to enter SEP 130 only if the operations address the secure mailbox 520. Other operations may not progress from the interconnect 140 into SEP 130. Even more particularly, filter 510 may permit write operations to the address assigned to the inbox portion of secure mailbox 520, and read operations to the address assigned to the outbox portion of the secure mailbox 520. All other read/write operations may be prevented/filtered by the filter 510. In some embodiments, filter 510 may respond to other read/write operations with an error. In one embodiment, filter 510 may sink write data associated with a filtered write operation without passing the write data on to local interconnect 580. In one embodiment, filter 510 may supply nonce data as read data for a filtered read operation. Nonce data (e.g., "garbage data") may generally be data that is not associated with the addressed resource within the SEP 130. Filter 510 may supply any data as nonce data (e.g. all zeros, all ones, random data from a random number generator, data programmed into filter 510 to respond as read data, the address of the read transaction, etc.).

In various embodiments, filter 510 may only filter incoming read/write operations. Thus, the components of the SEP 130 may have full access to the other components of computing device 100 such as NVM 120. Accordingly, filter 510 may not filter responses from interconnect 140 that are provided in response to read/write operations issued by SEP 130.

Secure mailbox 520 is circuitry that, in some embodiments, includes an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from interconnect 140. The outbox may store write data from write operations sourced by processor 530. (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on CPU 110 may request services of SEP 130 via an application programming interface (API) supported by OS 122—i.e., a requester may make API calls that request services of SEP 130. These calls may cause corresponding requests to be written to mailbox mechanism 520, which are then retrieved from mailbox 520 and analyzed by processor 530 to determine whether it should service the requests. Accordingly, this API may be used to send, via mailbox 520, for example, a passcode 204, a request 504 to generate a certified key pair including key 134 and 212, biometric data 502, etc. and receive, via mailbox 520, signature 127 and CSR 136. By isolating SEP 130 in this manner, integrity of SEP 130 may be enhanced.

SEP processor 530 is configured to process commands received from various sources in computing device 100 and may use various secure peripherals to accomplish the commands. Processor 530 may then execute instructions stored in ROM 540 such as authentication application 542 to perform an authentication of a user in order to use cryptographic services of SEP such as performing operations using signing key 134 discussed above. For example, SEP processor 530 may execute application 542 to provide appropriate commands to biosensor sensor pipeline 570 in order to verify biometric data 502 collected by a biosensor of device 100. In some embodiments, program instructions executed by SEP processor 530 are signed by a trusted authority (e.g., device 10's manufacturer) in order to ensure their integrity.

Secure ROM 540 is a memory configured to store program instruction for booting SEP 130. In some embodiments, ROM 540 may respond to only a specific address range assigned to secure ROM 540 on local interconnect 580. The address range may be hardwired, and processor 530 may be hardwired to fetch from the address range at boot in order to boot from secure ROM 540. Filter 510 may filter addresses within the address range assigned to secure ROM 540 (as mentioned above), preventing access to secure ROM 540 from components external to the SEP 130. In some embodiments, secure ROM 540 may include other software executed by SEP processor 530 during use. This software may include the program instructions to process inbox messages and generate outbox messages, etc.

Cryptographic engine 132 is circuitry configured to perform cryptographic operations for SEP 130, including key generation as well as encryption and decryption using keys in key storage 560. Cryptographic engine 132 may implement any suitable encryption algorithm such as Data Encryption Standard (DES), Advanced Encryption Standard (AES), Rivest Shamir Adleman (RSA), etc. In some embodiments, engine 132 may further implement elliptic curve cryptography (ECC). As discussed above, in various embodiments, engine 132 is responsible for generating signing key 134 used to produce signature 127.

Key storage 560 is a local memory (i.e., internal memory) configured to store cryptograph keys such as signing key 134, hardware key 214, and/or public key 212. In some embodiments, these keys may include keys used to establish the secure channels between SEP 130 and other elements such as an NVM controller of NVM 120 and a biosensor. Key storage 560 may include any type of memory such as the various examples of volatile or non-volatile memory listed below with respect to FIG. 7. In some embodiments, storage 560 may also include a set of fuses that are burnt during a fabrication of SEP 130 (or more generally device 100) in order to record keys such as UID 202 discussed above.

Biosensor sensor pipeline 570, in one embodiment, is circuitry configured to compare biometric data 502 captured by a biosensor from a user being authenticated with biometric data 572 of an authorized user. (In another embodiment, data 502 and 527 may be compared by software such as authentication application 542.) Biometric data may be data that uniquely identifies the user among other humans (at least to a high degree of accuracy) based on the user's physical or behavioral characteristics. In some embodiments in which data 502 is collected from a user's face, pipeline 570 may perform the comparison using a collection of neural networks included in pipeline 570, each network being configured to compare biometric data 502 captured in a single frame with biometric data 572 captured in multiple frames for an authorized user. As shown, pipeline 570 may be configured to read, from NVM 120, biometric data 572, which may be protected by encryption in some embodiments and/or be stored in an associated part of NVM 120 that is only accessible to SEP 130. (In another embodiment, SEP 130 may store data 572 internally.) Based on the comparison of biometric data 502 and 572, SEP 130 may provide an authentication result indicating whether the authentication was successful or failed. Such an authentication result may be used, for example, to grant use of signing key 134.

Exemplary Computer System

Figure 6:
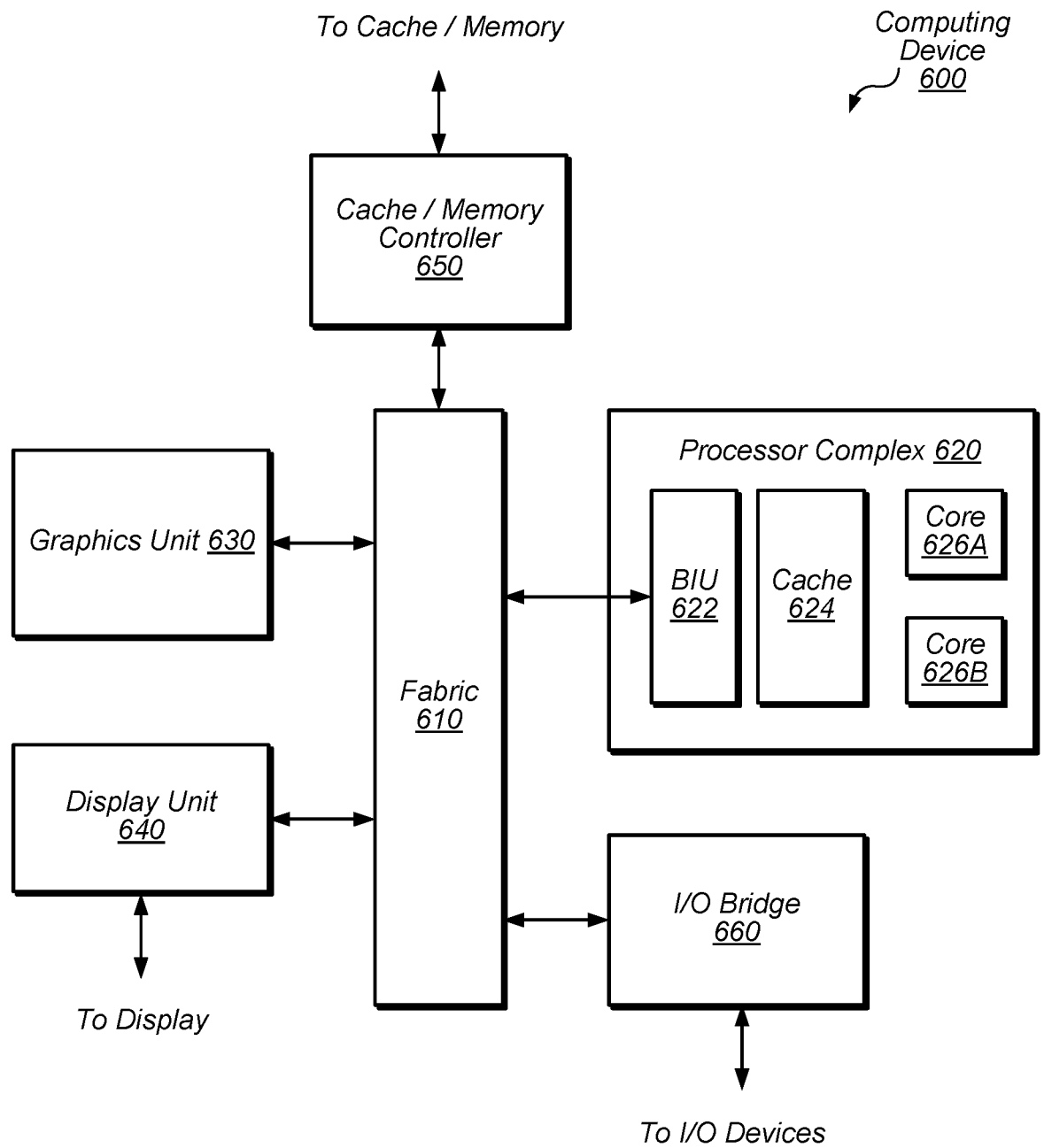
FIG. 6 is a block diagram illustrating one embodiment of an exemplary computing device.

Turning now to FIG. 6, a block diagram illustrating an exemplary embodiment of a computing device 600, which may implement functionality of computing device 100, is shown. Device 600 may correspond to any suitable computing device such as a server system, personal computer system, desktop computer, laptop or notebook computer, mainframe computer system, tablet computer, handheld computer, workstation, network computer, a mobile phone, music player, personal data assistant (PDA), wearable device, internet of things (IoT) device, etc. In the illustrated embodiment, device 600 includes fabric 610, processor complex 620, graphics unit 630, display unit 640, cache/memory controller 650, input/output (I/O) bridge 660. In some embodiments, elements of device 600 may be included within a system on a chip (SOC).

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally. As used herein, the term "coupled to" may indicate one or more connections between elements, and a coupling may include intervening elements. For example, in FIG. 6, graphics unit 630 may be described as "coupled to" a memory through fabric 610 and cache/memory controller 650. In contrast, in the illustrated embodiment of FIG. 6, graphics unit 630 is "directly coupled" to fabric 610 because there are no intervening elements. In some embodiments, fabric 610 corresponds to interconnect 140.

In the illustrated embodiment, processor complex 620 includes bus interface unit (BIU) 622, cache 624, and cores 626A and 626B. In various embodiments, processor complex 620 may include various numbers of processors, processor cores and/or caches. For example, processor complex 620 may include 1, 2, or 4 processor cores, or any other suitable number. In one embodiment, cache 624 is a set associative L2 cache. In some embodiments, cores 626A and/or 626B may include internal instruction and/or data caches. In some embodiments, a coherency unit (not shown) in fabric 610, cache 624, or elsewhere in device 600 may be configured to maintain coherency between various caches of device 600. BIU 622 may be configured to manage communication between processor complex 620 and other elements of device 600. Processor cores such as cores 626 may be configured to execute instructions of a particular instruction set architecture (ISA), which may include instructions of OS 122, bootloader 124, a user application, etc. These instructions may be stored in computer readable medium such as a memory coupled to memory controller 650 discussed below. In some embodiments, CPU 110 corresponds to complex 620.

Graphics unit 630 may include one or more processors and/or one or more graphics processing units (GPU's). Graphics unit 630 may receive graphics-oriented instructions, such as OPENGL®, Metal, or DIRECT3D® instructions, for example. Graphics unit 630 may execute specialized GPU instructions or perform other operations based on the received graphics-oriented instructions. Graphics unit 630 may generally be configured to process large blocks of data in parallel and may build images in a frame buffer for output to a display. Graphics unit 630 may include transform, lighting, triangle, and/or rendering engines in one or more graphics processing pipelines. Graphics unit 630 may output pixel information for display images.

Display unit 640 may be configured to read data from a frame buffer and provide a stream of pixel values for display. Display unit 640 may be configured as a display pipeline in some embodiments. Additionally, display unit 640 may be configured to blend multiple frames to produce an output frame. Further, display unit 640 may include one or more interfaces (e.g., MIPI® or embedded display port (eDP)) for coupling to a user display (e.g., a touchscreen or an external display).

Cache/memory controller 650 may be configured to manage transfer of data between fabric 610 and one or more caches and/or memories. For example, cache/memory controller 650 may be coupled to an L3 cache, which may in turn be coupled to a system memory. In other embodiments, cache/memory controller 650 may be directly coupled to a memory. In some embodiments, cache/memory controller 650 may include one or more internal caches. Memory coupled to controller 650 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 650 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 620 to cause device 600 to perform functionality described herein.

I/O bridge 660 may include various elements configured to implement universal serial bus (USB) communications, security, audio, and/or low-power always-on functionality, for example. I/O bridge 660 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 660. For example, these devices may include various types of wireless communication (e.g., Wi-Fi, Bluetooth, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computing device, comprising:
   a processor;
   a secure circuit configured to:
      generate a public key pair; and
      sign, using a private key of the public key pair, configuration settings for an operating system of the computing device, wherein the configuration settings include one or more security settings that enable or disable one or more protection systems implemented by the operating system to protect operation of the computing device; and
   memory having program instructions stored therein that are executable by the processor to cause the computing device to:
      receive, at a bootloader, a certificate for the public key pair from a certificate authority; and
      initiate, by the bootloader, a boot sequence to load the operating system, wherein the boot sequence includes the bootloader verifying the signed configuration settings using a public key included in the certificate and the public key pair.

2. The computing device of claim 1, wherein the secure circuit is further configured to:
   cryptographically protect the private key based on a passcode of a user, wherein the passcode is usable by the user to authenticate to the computing device.

3. The computing device of claim 2, wherein the secure circuit is further configured to:
   store a unique identifier (UID) that uniquely identifies the computing device from other computing devices; and
   cryptographically protect the private key based on the UID stored by the secure circuit.

4. The computing device of claim 2,
   wherein the program instructions are further executable to cause the computing device to:
      receive a request from the user to alter the configuration settings, wherein the request includes the passcode; and
      in response to the request, provide an altered version of the configuration settings and the passcode to the secure circuit;
   wherein the secure circuit is further configured to:
      use the passcode to obtain access to the private key; and
      use the private key to sign the altered version of the configuration settings.

5. The computing device of claim 4, wherein the program instructions are further executable to cause the computing device to:
   in response to the request to alter the configuration settings:
      generate a nonce for inclusion in the altered version of the configuration settings; and
      cause the secure circuit to use the private key to sign the nonce with the signing of the altered version of the configuration settings.

6. The computing device of claim 1, wherein the program instructions are further executable to cause the computing device to:
   send a user credential to a server system operable to perform a verification of the user credential and a confirmation that an owner has not requested a disabling of the computing device; and
   based on the verification and the confirmation, receive, from the server system, an attestation indicating that the computing device is authorized to request certification of the private key; and
   send the attestation and a certificate signing request for the public key pair to a certificate authority external to the computing device.

7. The computing device of claim 6, wherein the secure circuit is further configured to:
   read a hardware identifier embedded at manufacture to identify a presence of particular hardware in the computing device; and
   use the hardware identifier to sign the certificate signing request.

8. The computing device of claim 1, wherein the program instructions are further executable to cause the computing device to:
   prior to obtaining the signed configuration settings from the secure circuit, booting the operating system into a recovery mode in which the operating system requests, from a server system, an initial set of configuration settings signed by the server system; and
   providing the initial set of configuration settings for use by the operating system until the signed configuration settings are obtained from the secure circuit.

9. The computing device of claim 1, wherein the operating system is one of a plurality of operating systems having program instructions stored in the memory; and
   wherein the secure circuit is configured to:
      use the private key to sign configuration settings for respective ones of the plurality of operating systems.

10. A method, comprising:
    receiving, by a server system implementing a certificate authority, a certificate signing request for a public key pair generated by a secure circuit of a computing device; and
    issuing, by the server system, a certificate for the public key pair, wherein the issuing includes including signing the certificate with a private key trusted by a bootloader of the computing device, wherein the bootloader is executable to use the certificate during a boot sequence to verify configuration settings for an operating system that are signed by a private key of the public key pair generated by the secure circuit, wherein the configuration settings include one or more security settings that enable or disable one or more protection systems implemented by the operating system to protect operation of the computing device.

11. The method of claim 10, further comprising:
    verifying, by the server system, a signature of the certificate signing request, wherein the signature is generated using a hardware identifier embedded at manufacture to identify a presence of particular hardware in the computing device.

12. The method of claim 10, further comprising:
    prior to issuing the certificate:
       verifying, by the server system, a user credential received from the computing device; and
       confirming, by the server system, that an owner of the computing device has not requested a disabling of the computing device.

13. The method of claim 12, further comprising:
    based on the verification and the confirmation, providing, by the server system, an attestation indicating that the computing device is authorized to request certification of the public key pair; and verifying, by the server system, that the attestation has been provided with the certificate signing request.

14. The method of claim 10, further comprising:
prior to the configuration settings being signed, providing, by the server system, an initial set of configuration settings for use by the operating system until the signed configuration settings are obtained from the secure circuit.

15. A non-transitory computer readable medium having program instructions stored therein that are executable by a computing device to cause the computing device to perform operations comprising:
sending, to a secure circuit of the computing device, a request to use a private key to sign configuration settings for an operating system of the computing device, wherein the configuration settings control one or more security systems implemented by the computing device;
initiating, by a bootloader, a boot sequence to load the operating system, wherein the boot sequence includes:
reading, by the bootloader, the signed configuration settings and a certificate issued for a public key pair including the private key; and
verifying, by the bootloader, the signed configuration settings using a public key included in the certificate.

16. The computer readable medium of claim 15, wherein the operations further comprise:
providing, to the secure circuit, a passcode of a user to obtain access to the private key for signing the configuration settings.

17. The computer readable medium of claim 15, wherein the operations further comprise:
generating a nonce for inclusion in the configuration settings signed by the secure circuit; and
the bootloader verifying the inclusion of the nonce when verifying the signed configuration settings.

18. The computer readable medium of claim 15, wherein the operations further comprise:
booting, by the bootloader, the operating system into a recovery mode in which the operating system requests, from a server system, an initial set of configuration settings signed by the server system; and
using the initial set of configuration settings until the signed configuration settings are obtained from the secure circuit.

19. An apparatus, comprising:
a processor;
a secure circuit configured to:
generate a public key pair; and
sign, using a private key of the public key pair, configuration settings for an operating system of the apparatus; and
memory having program instructions stored therein that are executable by the processor to cause the apparatus to:
receive, at a bootloader, a certificate for the public key pair from a certificate authority;
initiate, by the bootloader, a boot sequence to load the operating system, wherein the boot sequence includes the bootloader verifying the signed configuration settings using a public key included in the certificate and the public key pair;
cryptographically protect the private key based on a passcode of a user, wherein the passcode is usable by the user to authenticate to the apparatus;
receive a request from the user to alter the configuration settings, wherein the request includes the passcode; and
in response to the request, provide an altered version of the configuration settings and the passcode to the secure circuit;
wherein the secure circuit is further configured to:
use the passcode to obtain access to the private key; and
use the private key to sign the altered version of the configuration settings.

20. An apparatus, comprising:
a processor;
a secure circuit configured to:
generate a public key pair; and
sign, using a private key of the public key pair, configuration settings for an operating system of the apparatus; and
memory having program instructions stored therein that are executable by the processor to cause the apparatus to:
send a user credential to a server system operable to perform a verification of the user credential and a confirmation that an owner has not requested a disabling of the apparatus;
based on the verification and the confirmation, receive, from the server system, an attestation indicating that the apparatus is authorized to request certification of the private key;
send the attestation and a certificate signing request for the public key pair to a certificate authority external to the apparatus;
receive, at a bootloader, a certificate for the public key pair from the certificate authority; and
initiate, by the bootloader, a boot sequence to load the operating system, wherein the boot sequence includes the bootloader verifying the signed configuration settings using a public key included in the certificate and the public key pair.

* * * * *